(12) United States Patent
Lee et al.

(10) Patent No.: US 7,864,704 B2
(45) Date of Patent: Jan. 4, 2011

(54) INTELLIGENT AUTOMATIC RECONFIGURATION METHOD AND APPARATUS FOR NETWORK SYSTEM

(75) Inventors: Shih Ching Lee, Taipei (TW); Pei Chuan Liu, Taipei (TW)

(73) Assignee: Cameo Communications Inc. (TW)

( * ) Notice: Subject to any disclaimer, the term of this patent is extended or adjusted under 35 U.S.C. 154(b) by 404 days.

(21) Appl. No.: 11/798,314

(22) Filed: May 11, 2007

(65) Prior Publication Data

US 2008/0130517 A1    Jun. 5, 2008

(30) Foreign Application Priority Data

Dec. 1, 2006    (TW) .............................. 95144585 A

(51) Int. Cl.
*H04L 12/28*    (2006.01)

(52) U.S. Cl. ........................ 370/254; 709/221; 709/212

(58) Field of Classification Search ........................ None
See application file for complete search history.

(56) References Cited

U.S. PATENT DOCUMENTS

| | | | | |
|---|---|---|---|---|
| 5,307,465 A * | 4/1994 | Iki | ............................. | 709/221 |
| 5,408,618 A * | 4/1995 | Aho et al. | ..................... | 710/104 |
| 5,574,860 A * | 11/1996 | Perlman et al. | ............. | 709/220 |
| 5,751,967 A * | 5/1998 | Raab et al. | ................... | 709/228 |
| 5,832,503 A * | 11/1998 | Malik et al. | .................. | 709/223 |
| 5,872,928 A * | 2/1999 | Lewis et al. | ................. | 709/222 |
| 6,212,585 B1 * | 4/2001 | Chrabaszcz | .................. | 710/302 |
| 6,243,747 B1 * | 6/2001 | Lewis et al. | ................. | 709/220 |
| 6,243,774 B1 * | 6/2001 | Eide et al. | .................... | 710/302 |
| 6,263,387 B1 * | 7/2001 | Chrabaszcz | .................. | 710/302 |
| 6,625,124 B1 * | 9/2003 | Fan et al. | ..................... | 370/235 |
| 6,961,762 B1 * | 11/2005 | Yeap et al. | ..................... | 709/221 |
| 6,982,953 B1 * | 1/2006 | Swales | ......................... | 370/218 |
| 7,469,279 B1 * | 12/2008 | Stamler et al. | .............. | 709/221 |
| 2003/0227878 A1 * | 12/2003 | Krumm-Heller et al. | .... | 370/254 |
| 2004/0199621 A1 * | 10/2004 | Lau | ............................. | 709/223 |
| 2005/0044196 A1 * | 2/2005 | Pullen et al. | ................ | 709/223 |
| 2005/0259571 A1 * | 11/2005 | Battou | ......................... | 370/217 |
| 2006/0236095 A1 * | 10/2006 | Smith et al. | .................. | 713/153 |

* cited by examiner

*Primary Examiner*—Ayaz R Sheikh
*Assistant Examiner*—Peter Chau

(57) ABSTRACT

A method and apparatus for intelligent automatic reconfiguration of a network system basically implements an automatic reconfiguration apparatus to acquire the configuration of every network device and generates a topology of the network devices. Afterward, the automatic reconfiguration apparatus can detect the status of the network devices. When some network device is replaced by a new network device due to a breakdown or other factors, the automatic reconfiguration apparatus can detect the changed status and check the hardware version as well as the corresponding location in the topology of the former network device. If the hardware version of the new network device is identical to the hardware version of the corresponding former network device in the topology, the disclosed apparatus can automatically load the stored prime configuration into the new network device for performing automatic configuration to the network device.

6 Claims, 5 Drawing Sheets

Switch_1 local infor

| Local MAC address | IP address | Port id | Device type | Local_Name |
|---|---|---|---|---|
| 00.13.46.36.53.EB | 172.20.5.109 | 8 | Switch | Swich_1 |

Switch_1 neighbor_infor

| Local port | Remote MAC address | Remote management address | Remote port id | Remote name |
|---|---|---|---|---|
| 1 | 00.13.46.36.54.53 | 172.20.5.110 | 1 | Swich_2 |
| 3 | 00.13.46.36.53.AA | 172.20.5.11 | 1 | AP_1 |

Switch_2 local infor

| Local MAC address | IP address | Port id | Device type | Local_Name |
|---|---|---|---|---|
| 00.13.46.36.54.53 | 172.20.5.110 | 8 | Switch | Swich_2 |

Switch_2 neighbor_infor

| Local port | Remote MAC address | Remote management address | Remote port id | Remote name |
|---|---|---|---|---|
| 1 | 00.13.46.36.53.EB | 172.20.5.109 | 1 | Swich_1 |
| 3 | 00.13.46.36.53.EA | 172.20.5.10 | 1 | AP_2 |
| 5 | 00.0F.3D.67.4D.1C | 172.20.5.41 | 1 | AP_3 |
| 7 | 00.0F.3D.67.4F.2E | 172.20.5.208 | 1 | AP_4 |

INTELLIGENT AUTOMATIC RECONFIGURATION METHOD AND APPARATUS FOR NETWORK SYSTEM

BACKGROUND OF INVENTION

1. Field of the Invention

The present invention relates to an intelligent automatic reconfiguration method and apparatus for network system and, more particularly, to a method and apparatus for intelligent automatic reconfiguration which involves in implementing an automatic reconfiguration apparatus for storing configuration of network devices of an Ethernet system and automatically loading a new network device with the stored original configuration when replacement of the network device occurs.

2. Description of the Prior Art

In an Ethernet LAN system, for instance, many mutually connected and stacked network devices, such as a hub, a switch hub, a bridge, and Wireless Access Points (AP), are usually included. Such devices are on the one part connected to the Internet through a server or a router, while on the other part are connected to network terminals such as computers, so as to allow the terminals to transmit data or connect to the Internet through the network devices.

It is imaginable that considerable manpower and time would be consumed by fault diagnosis in a large-scale network system. Conventionally, the problem is addressed by adding a Network Management Server (NMS) in a network system. The Network Management Server contains specific network management software and is compatible with Simple Network Management Protocol (SNMP). It monitors network status of the network devices on the strength of SNMP, and if errors were observed in any network devices, alarm would be sent to a network administrator, thereby allowing the administrator to examine and then remove the errors. Generally, network administrators would replace the erroneous device with a backup device, so that the network system could be restored to normal as soon as possible.

However, in the aforesaid technique, once an original device is replaced with a new device or an additional device is added, the administrator has to reconfigure the new device manually. This reconfiguring process may not only consume a lot of time and effort, but also bear risk of system disturbances resulted from failing to reconstruct the original configuration on the new device.

SUMMARY OF INVENTION

The main objective of the present invention is to provide an intelligent automatic reconfiguration method and apparatus for network system, which involves in implementing an automatic reconfiguration apparatus for storing original configuration of all network devices in a network system, automatically loading a new network device with the stored configuration, and verifying the new configuration after replacement of the network device occurs.

In order to achieve aforementioned objectives, this present invention provides a method and apparatus for intelligent automatic reconfiguration of a network system. The method basically implements an automatic reconfiguration apparatus to acquire the configuration of every network device and generates a topology of the network devices. Afterward, the automatic reconfiguration apparatus can detect the status of the network devices. When some network device is replaced by a new network device due to a breakdown or other factors, the automatic reconfiguration apparatus can detect the changed status and check the hardware version as well as the corresponding location in the topology of the former network device. If the hardware version of the new network device is identical to the hardware version of the corresponding former network device in the topology, the disclosed apparatus can automatically load the stored prime configuration into the new network device for performing automatic configuration to the network device. Moreover, if the network device that has the status changed has not been contained in the scope of the previously generated topology or if the hardware version is not is not identical, manual configuration is required.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 5 is a schematic drawing showing network device configuration stored in the database according to a preferred embodiment of the present invention.

DETAILED DESCRIPTION

Figure 1:
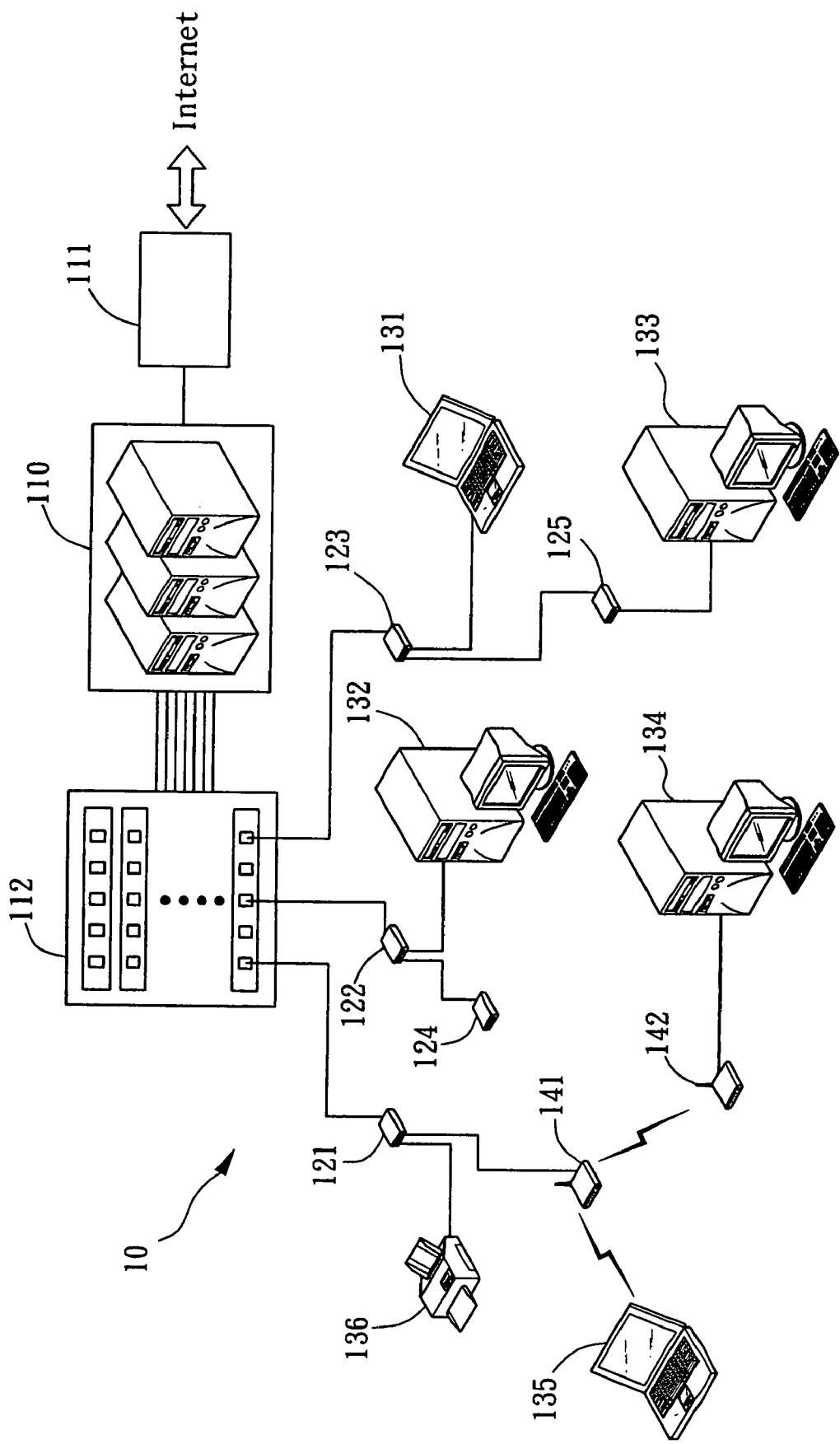
FIG. 1 shows a framework of one exemplificative network system according to the present invention.

Please refer to FIG. 1 for a framework of a typical network system 10 according to the present invention, wherein the network system 10 can be preferably an Ethernet system, for instance, but not limited to, a WAN (Wide Area Network), LAN (Local Area Network) or WLAN (Wireless Local Area Network) system. According to the depicted embodiment, the network system 10 may comprise one or more servers 110, which are on the one part connected to Internet or other network system through an Internet interface 111, such as a router, while on the other part are connected to a patch panel 112. By way of the numerous cable lines converge at the patch panel 112, may remote network devices can be connected to the server 110 and in turn able to demand Internet service or data transmission mutually through the network system 10. Such network devices may include, but not limited to, hubs or switches 121 to 125, Internet-assessable terminal computers 131 to 135, net connectable peripheral 136 (e.g. network printer), Access Points (AP) 141 to 142, a router, a broadband router, Network Management Server (NMS), a Wireless Dongle, a bridge, a network card and so on. These network devices, such as the switches 121 to 125 or the Access Points (AP) 141 to 142, can be directly connected to the patch panel 112 or be stacked with another switch 121 to 125 or another Access Points 141 to 142 before connected to the patch panel 112.

Further, in the present invention, there may be a physical automatic channel-selecting device (e.g. NMS, not shown) connected to the network system 10. Alternatively, the automatic channel-selecting device can be built as software in the server 110, or in switches 121 to 125, or in Access Points 141 to 142, or in terminal computers 131 to 135.

Figure 2:
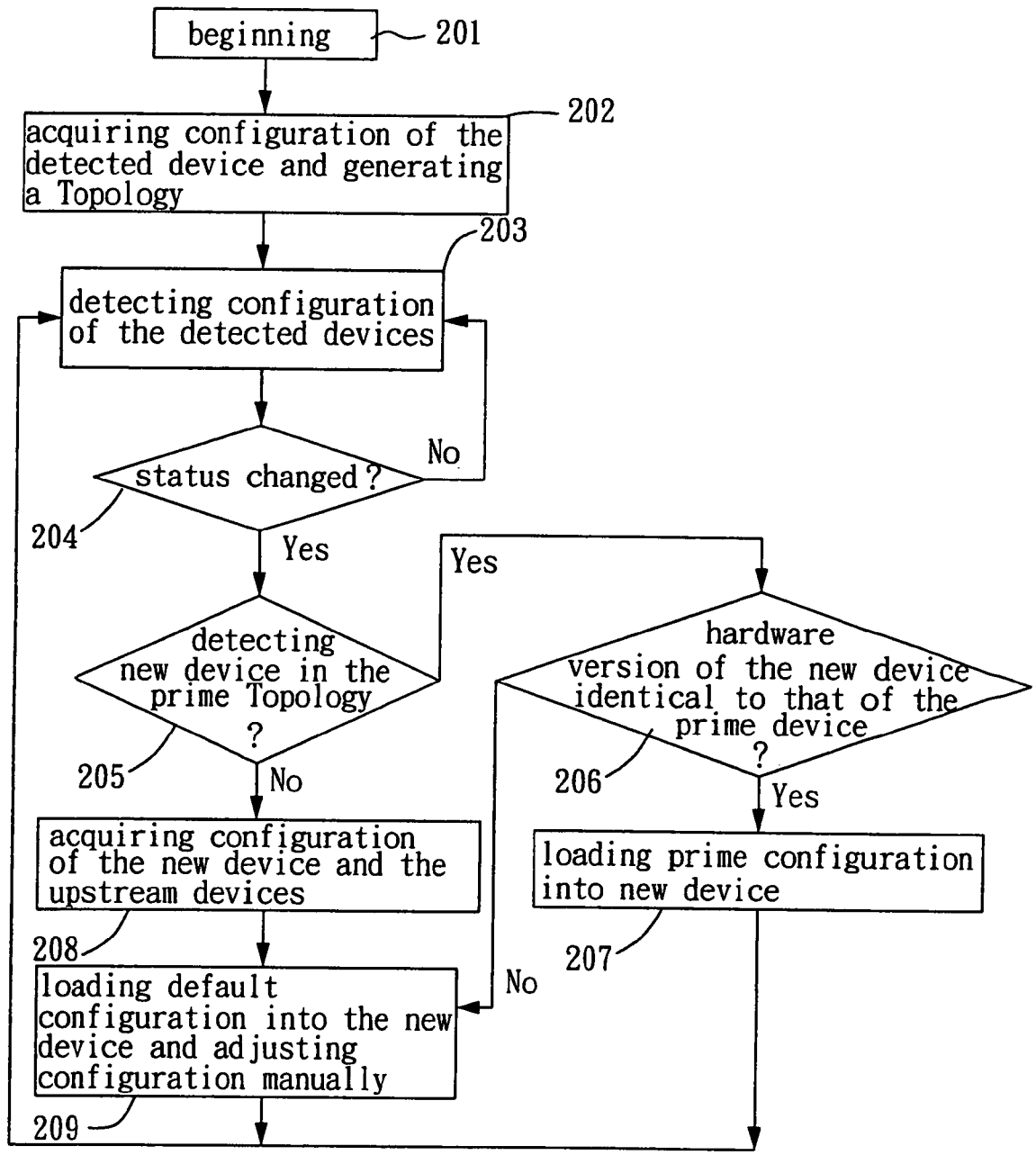
FIG. 2 is a functional flow diagram of the intelligent automatic reconfiguration method for network system according to the first embodiment of the present invention.

In FIG. 2, a functional flow diagram is provided for illustrating the intelligent automatic reconfiguration method for network system according to the first embodiment of the present invention. The sequence of steps composing the method is elaborated in the following:

In Step 201, as a beginning, the automatic reconfiguration apparatus of the present is switched on for performing the disclosed method of intelligent automatic reconfiguration.

As to Step 202, the automatic reconfiguration apparatus is now conducting scan over all the network devices (especially the switches and Access Points) of the network system on the strength of Simple Network Management Protocol (SNMP) to acquire and store the configuration thereof in a database. Also, in the present step, the automatic reconfiguration apparatus can scan configuration of every physical or virtual port of every network device within the network system and generate a topology among the network devices with the configuration. Moreover, the automatic reconfiguration apparatus can acquire and store MAC Address, port information, hardware version as well as other details of configuration in the database thereof. As to the method for generating the topology, it will be explained below with examples.

Regarding Step 203, after the database and topology are accomplished, the automatic reconfiguration apparatus can perform scheduled detection of network devices configuration of the network system. In the present step, the method for detecting network devices configuration is to detect whether a checksum change exists or not. If the result of detection is positive, it is indicated that a configuration change of the network devices exists, wherein, the checksum is a mathematically computed value depending on network devices configuration, including aforesaid MAC Address, port information and so on, which can be acquired or transmitted under Simple Network Management Protocol (SNMP). As long as the configuration is changed, the corresponding checksum is definitely changed.

Concerning Step 204, the automatic reconfiguration apparatus automatically detects a possible configuration change of network devices (i.e. checksum change) to see whether it exists or not. If the result indicates "YES", Step 205 is subsequently conducted while if the result indicates "NO", the sequence returns to Step 203. In the present step, once a configuration change of network devices (i.e. checksum change) is detected, the automatic reconfiguration apparatus can firstly reveal the configuration of the changed device for the administrator to promptly comprehend the problem. If the network problem is about a fault of some network device that interrupts the network service, the administrator can promptly reach the exact location of the malfunctioning device in the previously generated topology according to the stored prime port and MAC Address information of the device. Thus, the administrator can swiftly replace the malfunctioning network device with a substitute new network device (generally a backup network device) so as to restore the network system to normal in the shortest possible time.

About Step 205, if the automatic reconfiguration apparatus detects the new network device as described in Step 204, it can firstly acquire the configuration of the new network device and determine whether the acquired configuration has been contained in the scope of the previously generated topology. If the determination says "YES", it is recognized that the new device is implemented as a replacement for some former device of the network system and the disclosed method is continued by performing Step 206. On the contrary, if the determination says "NO", it is indicated that the new device is a new addition to the network system and Step 208 is subsequently conducted.

In Step 206, the automatic reconfiguration apparatus compares a hardware version of the new network device to the stored hardware version of the former network device located at a corresponding position in the prime topology to see whether they are identical. If the result is "YES", the disclosed method is continued by performing Step 207. On the other hand, if the result is "NO", Step 209 is subsequently conducted.

Referring to Step 207, if the former and new network devices are identical, that means the new device is compatible with the prime configuration. Thus, the disclosed automatic reconfiguration apparatus can duplicate and load the corresponding prime configuration (except for MAC Address) stored in the database of the automatic reconfiguration apparatus into the new network device. And then the disclosed method returns to Step 203 for scheduled detection of network devices configuration. Thereupon, the new network device can work with the prime configuration and therefore intelligent automatic reconfiguration is achieved. As the new network device is almost the equivalent of the former network device (except for MAC Address), it can work without disturbing the network system. Afterward, the administrator has merely to inspect and verify whether the new network device after automatic reconfiguration operates normally in the network system, and can be free from reconfiguring the new network device manually.

Touching upon Step 208, if the new device is a new addition to the system but not a replacement for some former device, the automatic reconfiguration apparatus can acquire the configuration of the new device and the upstream devices such as port information.

Finally, in Step 209, the automatic reconfiguration apparatus can load a default configuration previously stored therein into the new network device and perform automatic reconfiguration with the default configuration. Afterward, manual adjustment and verification of the parameters are conducted by the administrator to ensure the new network device is working normally and prevent it from disturbing the network system. Once the reconfiguration is accomplished, the configuration of the new network device and the configuration acquired in Step 208 can be transmitted to the automatic reconfiguration apparatus for regenerating a new topology containing the new network device to be stored in the database for further use.

Figure 3:
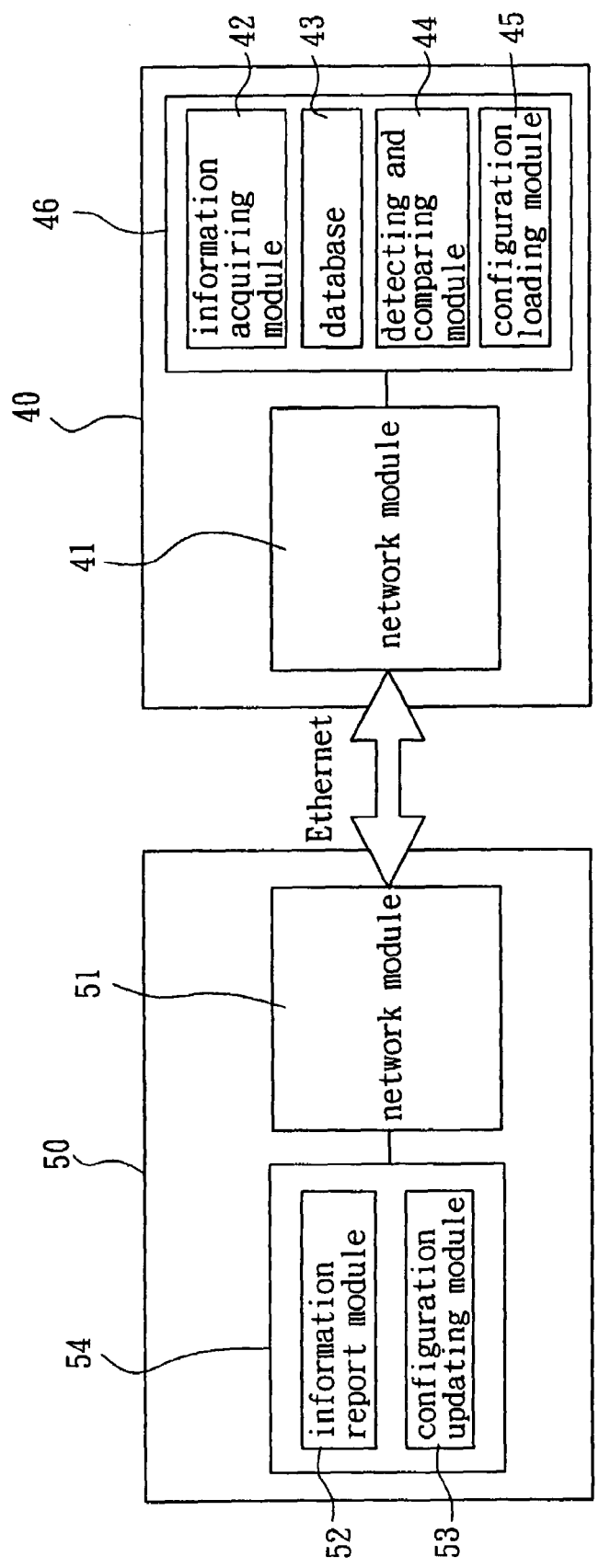
FIG. 3 shows a framework of the intelligent automatic reconfiguration apparatus for network system according to a preferred embodiment of the present invention.

Now please refer to FIG. 3 for a framework of the automatic reconfiguration apparatus 40 and network devices 50 in the network system according to a preferred embodiment of the present invention. As can be seen through the drawing, the automatic reconfiguration apparatus 40 further comprises a network module 41, an information acquiring module 42, a database 43, a detecting and comparing module 44, and a configuration loading module 45 which are contained in a non-volatile memory 46 in forms of software. According to one embodiment of the present invention, the automatic reconfiguration apparatus 40 can be an independent hardware device (e.g. NMS) connected to another network device 50 through a network system. In an alternative embodiment, the automatic reconfiguration apparatus 40 can also be built in the memory of some network device as software. As to the network system, it is preferably an Ethernet system, such as, but not limited to, a wide area network (WAN) system, a local area network (LAN) system, or a wireless LAN system.

The network module 41 herein provides connection and implements all the required functions of the network system. As such network module 41 is well known in the art and not a characteristic where the present invention relies on, it is not discussed at length herein. The information acquiring module 42 is provided for acquiring configuration of the network devices 50 interconnected within the network system, such as, but not limited to, MAC Address, port information, hardware version and other details of configuration. The database 43 is for storing at least the acquired configuration. The detecting and comparing module 44 is provided to detect a configuration change of the network device 50 and produce a corresponding detection result. As described previously, the detecting and comparing module 44 works relying on detecting the change of checksum of the network device 50. If the checksum is changed, it is suggested that a change of the corresponding network device 50 exists. The configuration loading module 45 functions, according to the detection result, transmitting the configuration logged in the database to the network device 50 and performs automatic reconfiguration thereto. In the present embodiment, the information acquiring module 42, detecting and comparing module 44 and configuration loading module 45 conduct configuration acquiring, status detecting and automatic configuration to the network device 50 under Simple Network Management Protocol (SNMP).

Moreover, in the present invention, the network device 50 can be any device which is capable of providing network service and, generally, can be one of the following: a hub, a switch, a router, a broadband a router, Network Management Server (NMS), Wireless Assess Points, Wireless Dongle, network card and so on. Furthermore, the network device 50 comprises a network module 51, an information report module 52 and a configuration updating module 53, wherein, the information report module 52 and configuration updating module 53 are built in a Non-Volatile Random Access Memory 54 as software. Similarly, the network module 51 is for providing connection and implementing all the required functions of the network as a well-known article in the art. The information report module 52 is to transmit the configuration of the network device 50 to the automatic reconfiguration apparatus 40. The configuration-updating module 53 is provided for receiving the configuration coming from the automatic reconfiguration apparatus 40, saving the configuration as a practicing configuration thereof and fulfilling the objective of the present invention, namely automatic configuration.

Figure 4:
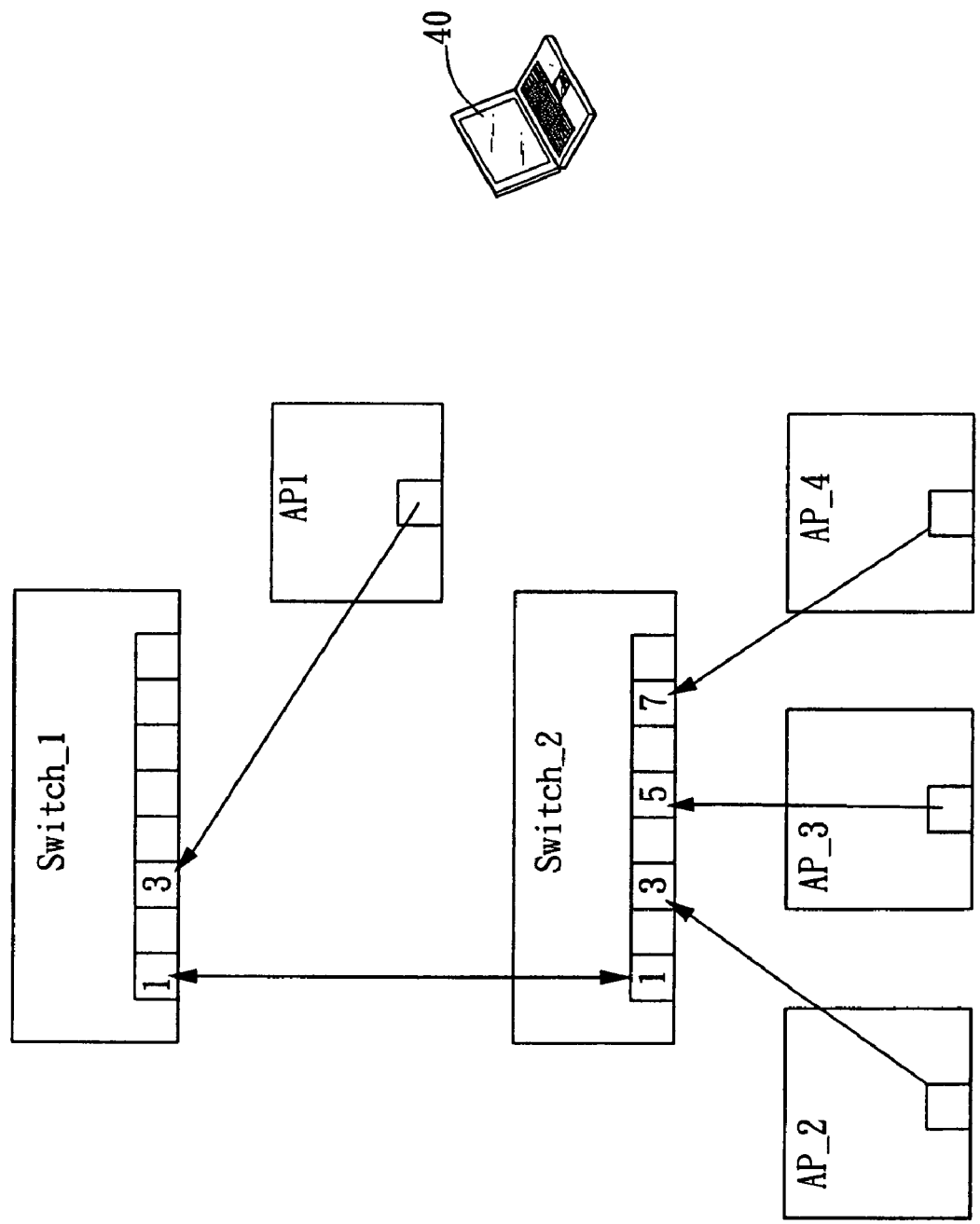
FIG. 4 is a Topology diagram according to a preferred embodiment of the present invention.

Reference is now made to FIGS. 4 and 5, which are respectively a topology diagram according to a preferred embodiment of the present invention, and a schematic drawing showing network device configuration logged in the database according to a preferred embodiment of the present invention. When performing Step 202 of FIG. 2 to acquire configuration and generate a topology, the automatic reconfiguration apparatus 40 can firstly scan and acquire configuration of other network devices 50 on the strength of SNMP and archive the acquired configuration in the database. Generally speaking, the acquired configuration of the switches to be managed and the performance of automatic reconfiguration includes, but not limited to, switch MAC, IP, sysObjectID, checksum, LLDP local portid, remote portid, remote MAC and remote management IP. Other details of configuration such as VLAN, traffic manager may be also required for other types of devices. For those assess points which only needs to submit their own configuration, the submitted configuration includes MAC, IP, portid, checksum, sysObjectID or the like. Other details of configuration such as ssid, channel, and security may be also required for other types of devices. According to the present invention, the automatic reconfiguration apparatus 40 can figure out the topology among the network devices of the network system and connecting information among the ports of the network devices according to the configuration that it collects from all the network devices of the network system. For instance, network devices as transmitters (AP1 to AP4) of a link layer topology and other network devices as receivers and transmitters (Switch_1 and Switch_2) of the link layer topology are described in FIG. 4. The configuration of the Switch_2 and AP1 are collected by adjacent networks device Switch_1 in virtue of NMS software contained in the software and database system of the automatic reconfiguration apparatus 40. Further, Switch_2 in turn receives configuration collected from the adjacent networks devices and the collecting work continues until all the configuration of all the networks devices are aggregated. Such configuration can be tabled and saved in the database of the automatic reconfiguration apparatus 40. By means of the configuration in FIG. 5, a complete visional topology diagram of the network system, like the one shown in FIG. 4, can be generated. The topology diagram not only contains configuration and port information among network devices, but is also automatically updateable according to variation of the devices for a predetermined time interval so that topology accuracy of the network system can be ensured.

While the invention has been described by way of examples and in terms of the preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. Accordingly, that above disclosure should be construed as limited only by the metes and bounds of the appended claims.

What is claimed is:

1. A method for intelligent automatic reconfiguration of network system, said method being executed by an automatic reconfiguration apparatus and comprising the steps of:

acquiring configuration of at least one network device connected to said network system and storing the configuration acquired from said at least one network device in a database;

generating a topology of said at least one network device according to the acquired configuration for determining connections among all of the at least one network device;

wherein, said topology contains at least a MAC address of each network device and a port information according to the connections among all of the at least one network device;

detecting a status of one of the at least one network device;

wherein detecting the status of one of the at least one network device is to detect whether a checksum of the detected network device is changed or not, wherein if the checksum is changed, it is indicated that the status of the detected network device is changed;

and determining whether to transmit the configuration stored in the database to the detected network device for implementing automatic reconfiguration therein according to a result derived from detecting said status of the detected network device;

wherein, the step of determining whether to transmit the configuration stored in the database to the detected network device includes following steps:

when a result of the detecting reveals that said status of the detected network device is changed, checking whether the status-changed network device is a replacement of any network device contained in the topology by means of the port information;

and if the status-changed network device is a replacement, checking whether a hardware version of the status-changed network device is identical to a hardware version in the configuration stored in the database corresponding a corresponding position in the topology corresponding to the status-changed network device;

if the hardware version is identical, then transmitting the acquired configuration stored in the database to the status-changed network device for performing automatic configuration;

if the status-changed network device is not a replacement or the hardware version is not identical, then the acquired configuration will not be transmitted to the status-changed network device.

2. The method of claim 1, wherein the method for acquiring configuration of at least one network device is performed under Simple Network Management Protocol (SNMP).

3. The method of claim 1, wherein either if the status-changed network device is not a replacement or if the hardware version is not identical, manual configuration is required.

4. The method of claim 1, wherein the network system is an Ethernet system and is selected from one of the following: WAN (Wide Area Network), LAN (Local Area Network) and WLAN (Wireless Local Area Network).

5. The method of claim 1, wherein the at least one network device is selected from one of the following: a hub, a switch, a router, a broadband router, a NMS (Network Management Server), an AP (Access Point), a Wireless Dongle and a network card.

6. A method for intelligent automatic reconfiguration of network system, said method being executed by an automatic reconfiguration apparatus and comprising the steps of:

acquiring configuration of at least one network device connected to said network system and storing the configuration acquired from said at least one network device in a database;

generating a topology of said at least one network device according to the acquired configuration for determining connections among all of the at least one network device;

wherein, said topology contains at least a MAC address of each network device and a port information according to the connections among all of the at least one network device;

detecting a status of one of the at least one network device;

and determining whether to transmit the configuration stored in the database to the detected network device for implementing automatic reconfiguration therein according to a result derived from detecting said status of the detected network device;

wherein, the step of determining whether to transmit the configuration stored in the database to the detected network device includes following steps:

when a result of the detecting reveals that said status of the detected network device is changed, checking whether the status-changed network device is a replacement of any network device contained in the topology by means of the port information;

and if the status-changed network device is a replacement, checking whether a hardware version of the status-changed network device is identical to a hardware version in the configuration stored in the database corresponding a corresponding position in the topology corresponding to the status-changed network device;

if the hardware version is identical, then transmitting the acquired configuration stored in the database to the status-changed network device for performing automatic configuration;

if the status-changed network device is not a replacement or the hardware version is not identical, then the acquired configuration will not be transmitted to the status-changed network device;

if the status-changed network device is not a replacement, it is indicated that the status-changed network device is a new addition to the network system, and thus the automatic reconfiguration apparatus will acquire the configuration of the status-changed network device and its port information;

and if the status-changed network device is a replacement but the hardware version is not identical, then a default configuration pre-stored in the database of the automatic reconfiguration apparatus will be transmitted to the status-changed network device for performing configuration manually.

* * * * *